United States Patent
Dmitriev et al.

(10) Patent No.: US 7,325,106 B1
(45) Date of Patent: *Jan. 29, 2008

(54) METHOD FOR MONITORING HEAP FOR MEMORY LEAKS

(75) Inventors: Mikhail A. Dmitriev, Sunnyvale, CA (US); Mario I. Wolczko, San Carlos, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 403 days.

This patent is subject to a terminal disclaimer.

(21) Appl. No.: 10/893,090

(22) Filed: Jul. 16, 2004

(51) Int. Cl.
*G06F 12/02* (2006.01)
(52) U.S. Cl. ....................... 711/159; 711/170
(58) Field of Classification Search ............. 711/170, 711/159; 707/206; 717/128
See application file for complete search history.

(56) References Cited

U.S. PATENT DOCUMENTS

| | | | |
|---|---|---|---|
| 5,920,876 A * | 7/1999 | Ungar et al. ............. | 707/206 |
| 6,560,773 B1 * | 5/2003 | Alexander et al. ........ | 717/128 |
| 6,658,652 B1 * | 12/2003 | Alexander et al. ........ | 717/128 |
| 6,782,462 B2 * | 8/2004 | Marion et al. ............. | 711/170 |
| 2002/0078077 A1 * | 6/2002 | Baumann et al. .......... | 707/206 |
| 2004/0133895 A1 * | 7/2004 | Dahlstedt et al. ......... | 719/310 |

* cited by examiner

*Primary Examiner*—Matthew Kim
*Assistant Examiner*—Paul Schlie
(74) *Attorney, Agent, or Firm*—Martine Penilla & Gencarella, LLP

(57) ABSTRACT

A low overhead method for identifying memory leaks is provided. The low overhead method includes a) detecting completion of a garbage collection cycle; and b) identifying a boundary between used objects in memory and free memory space. The steps of a) and b) are repeated and then it is determined if there is an existing memory leak based upon evaluation of boundary identifiers. A computer readable media and a system for identifying memory leaks for an object-oriented application are also provided.

19 Claims, 11 Drawing Sheets

| epoch | # of surviving objects |
|---|---|
| 1 | 1 |
| 2 | 2 |
| 3 | 1 |
| 4 | 3 |
| 5 | 2 |

| surviving object ID | epoch |
|---|---|
| object A | 1 |
| object B | 2 |
| object C | 2 |
| object D | 3 |
| object E | 4 |
| object F | 4 |
| object G | 4 |
| object H | 5 |
| object I | 5 |

| epoch | # of surviving objects |
|---|---|
| 1 | 1 |
| 2 | 1 |
| 3 | 1 |
| 4 | 2 |
| 5 | 2 |

| surviving object ID | epoch |
|---|---|
| object A | 1 |
| object B | 2 |
| object D | 3 |
| object E | 4 |
| object G | 4 |
| object H | 5 |
| object I | 5 |

| epoch | number of objects surviving |
|---|---|
| 1 | 3 |
| 2 | 2 |
| 4 | 1 |
| 5 | 2 |
| 6 | 5 |
| 8 | 2 |
| 9 | 1 |
| 11 | 3 |

Fig. 4A

| epoch | # of surviving objects |
|---|---|
| 20 | 10,000 |
| 21 | 10,000 |

Fig. 4B

```
1   x 1 = new String
2
3   x 2 = new Foo()
4
5   x 3 = new Foo()
6
7
8   x 4 = new Bar()
9
10  x 5 = new Bar
11
12
 :
 :
```

| String line 1 | |
|---|---|
| epoch | obj. |
| 9 | X |
| 10 | X |
| 11 | X |

114

| Foo line 3 | |
|---|---|
| epoch | obj. |
| 7 | X |
| 10 | X |
| 11 | X |

115

| Foo line 5 | |
|---|---|
| epoch | obj. |
| 9 | X |
| 10 | X |
| 11 | X |

116

| Bar line 8 | |
|---|---|
| epoch | obj. |
| 7 | X |
| 9 | X |
| 10 | X |
| 11 | X |

117

| Bar line 10 | |
|---|---|
| epoch | obj. |
| 1 | X |
| 2 | X |
| 3 | X |
| 4 | X |
| 5 | X |
| 6 | X |
| 7 | X |
| 8 | X |
| 9 | X |
| 10 | X |
| 11 | X |
| 12 | X |

METHOD FOR MONITORING HEAP FOR MEMORY LEAKS

CROSS REFERENCE TO RELATED APPLICATIONS

This application is related to U.S. patent application Ser. No. 10/783,863 filed on Feb. 20, 2004, and entitled "METHOD FOR SEMI-STATISTICAL COLLECTION OF OBJECT ALLOCATION PROFILING INFORMATION," and U.S. patent application Ser. No. 10/893,069 filed on the same day as the instant application, and entitled "METHOD FOR IDENTIFICATION OF OBJECTS CAUSING MEMORY LEAKS." These applications are herein incorporated by reference in their entirety for all purposes.

BACKGROUND OF THE INVENTION

1. Field of the Invention

The present invention relates generally to object-oriented programs, and more specifically to detecting memory leaks in an executing object-oriented program.

2. Description of the Related Art

Most of the programming languages/run time systems support dynamic memory allocation and reclamation. In object-oriented languages, memory can be reserved and released on a per-object basis, e.g., through object allocation and reclamation. In some languages, for example, C++, freeing memory occupied by an object is done explicitly, by calling a special system function. In other object-oriented languages, e.g., Java, that support so-called automatic memory management, memory occupied by objects that are not in use anymore is reclaimed automatically by a run time subsystem called a garbage collector. In Java, an object is considered unused and available for reclamation if it is not reachable directly or transitively from any object graph root. These roots (omitting some second order implementation specific details) are stack frames, i.e., object type local variables of currently executing methods, and object type static variables of currently loaded classes.

A memory leak in a program written in a language such as C++, with manual memory management, is a well-known problem that happens when a program does not explicitly free some objects or memory area that is previously reserved. If in the course of program execution, allocations without reclamation repeat over and over again, these allocations may ultimately exhaust all the available memory, causing the program to crash.

It should be appreciated that even in a language such as Java, that features automatic memory management, it is still possible to have memory leaks. Such leaks happen when some object remains reachable, but is not used anymore. That is, the program does not read or write its data fields. For example, a program may allocate a temporary object, attach it to some permanent automatically growable data structure, such as an instance of java.util.Vector. This temporary object is used for some period of time and then (logically) discarded. However, the object remains attached to the permanent data structure and cannot be reclaimed by the garbage collector. Over time, a large number of such unused objects can exhaust the memory available to the program, making the latter stop.

Another type of memory leak occurs when a data structure is designed poorly and keeps growing in an unlimited manner. A classical example is a persistent object cache that is not flushed properly. Strictly speaking, objects in such a cache are not unused, i.e., the program can request any of them at any moment. However, if the cache does not take care of evicting some objects periodically, it may ultimately grow too large, thereby exhausting the memory available for the program.

In light of the foregoing, it is desirable to implement a scheme for a method to identify memory leaks occurring in an object-oriented program in a manner that does not impose noticeable runtime overhead.

SUMMARY OF THE INVENTION

Broadly speaking, the present invention fills these needs by providing a scheme for identifying memory leaks without substantially adding to runtime overhead. The present invention can be implemented in numerous ways, including as an apparatus, a system, a device, or a method. Several embodiments of the present invention are described below.

In one embodiment, a low overhead method for identifying memory leaks is provided. The low overhead method includes a) detecting completion of a garbage collection cycle and b) identifying a boundary between used objects in memory and free memory space. The steps of a) and b) are repeated and then it is determined if there is an existing memory leak based upon evaluation of boundary identifiers.

In another embodiment, a computer readable medium having program instructions for providing a low overhead method for identifying memory leaks is provided. The computer readable medium includes a) program instructions for detecting completion of a garbage collection cycle; and b) program instructions for identifying a boundary between used objects in memory and free memory space. Program instructions for repeating a) and b) after each garbage collection cycle are provided. Program instructions for determining existence of memory leaks based upon evaluation of boundary identifiers are included.

In yet another embodiment, a system for identifying memory leaks for an object-oriented application is provided. The system includes a microprocessor configured to execute the object-oriented application. A memory in communication with the microprocessor over a bus is included. Memory leak logic configured to track object allocation is provided. The memory leak logic includes logic for detecting completion of the garbage collection event; logic for labeling each surviving generation from successive garbage collection events; and logic for determining existence of memory leaks based upon an increase in surviving generations after the successive garbage collection events.

Other aspects and advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and constitute part of this specification, illustrate exemplary embodiments of the invention and together with the description serve to explain the principles of the invention.

FIGS. 3A and 3B represent the tables of FIGS. 2A and 2B, respectively, after an object reclamation event in accordance with one embodiment of the invention.

FIGS. 4A and 4B represent exemplary epoch/number of surviving object pairs captured in tables in accordance with one embodiment of the invention.

FIG. 4C illustrates an epoch/surviving generation pair table corresponding to line numbers of an application in accordance with one embodiment of the invention.

DETAILED DESCRIPTION

Figures 1, 2A, 2B:
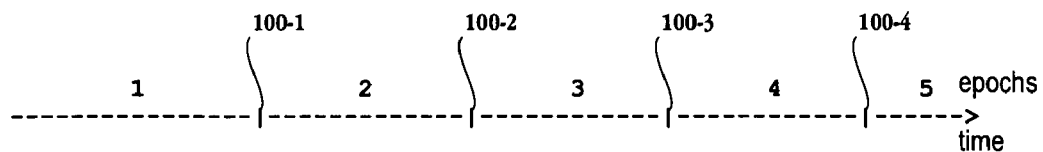
FIG. 1 is a simplified schematic diagram illustrating a run time for an application being divided into epochs in accordance with one embodiment of the invention.
FIGS. 2A and 2B represent exemplary data structures, e.g., tables, that may be used to capture object allocation data in accordance with one embodiment of the invention.

An invention is described for a system and method for evaluating whether an object-oriented program has memory leaks. It will be obvious, however, to one skilled in the art, that the present invention may be practiced without some or all of these specific details. In other instances, well known process operations have not been described in detail in order not to unnecessarily obscure the present invention.

The embodiments of the present invention provide a tool capable of collecting, processing, and presenting data that may be used to determine if a memory leak is occurring. In one embodiment, a profiling tool may be used to inject code into the application in order to provide a profile. One such profiling tool is discussed in application Ser. No. 10/783, 863. The injected code then generates events when the injected code is executed. From these events include, a system administrator is able to detect memory leaks and determine the cause of the memory leaks. Discussed below is a brief overview of the profiling tool that may be used in conjunction with the memory leak detection embodiments. Thereafter, the memory leak detection schemes are described in detail.

In order to minimize the overhead associated with the profiling scheme when tracking allocated objects, the embodiments described herein capture a portion of the call stacks associated with each allocated object. In one embodiment, a value representing the interval between object allocation events, at which call stacks are captured, varies around some base value in a random fashion in order to provide the most accurate snapshot of the allocation pathways. In another embodiment, the developer is allowed to control, with the possible effect of significantly reducing, the overhead associated with object allocation profiling, by changing the above base value.

Each object allocation site, i.e. a location in the application's code where object allocation instruction(s) are located, is instrumented, so that every time an object is allocated, the information about this event is recorded. Instrumentation may be performed in either the source or the binary code, and in many possible ways. For example, a call to a special predefined function may be inserted just before or just after the call to the "new" operator, as in the following example (one skilled in the art will appreciate that while the code samples provided in this application are written in Java, the invention is not restricted to a Java programming language. That is, any suitable object-oriented programming language may utilize the profiling tool discussed herein):

// Original code
MyClass c = new MyClass( );
// Instrumented code
MyClass c = new MyClass( );
ProfilerClass.recordObjectAllocation("MyClass");

The recordObjectAllocation(className) method is called every time an object is allocated, and it records the fact that an object of the given type has been allocated by the application. This method may also sample the current stack contents, to obtain the full call path that leads to the given object allocation. Stack sampling can be performed differently depending on the programming language, environment, and platform used. It can be implemented as e.g. a low-level mechanism, written in assembly language, that traverses the physical stack for a given thread. For high-level languages such as Java, a special mechanism, such as the Java Virtual Machine Profiler Interface (JVMPI) Application Programming Interface (API), may exist, that returns the contents of the stack corresponding to the Java program methods. The JVMPI is a two-way function call interface between the Java virtual machine and an in-process profiler agent.

It should be appreciated that it is possible to further provide data about the number and types of allocated objects. In addition, stack sampling is performed statistically, thereby resulting in the semi-statistical characterization of the profiling tool. It should be appreciated that the above recordObjectAllocation( ) function or an equivalent is called every time when an object is allocated and records the fact that the object of the given type has been allocated. However, stack sampling is performed only once in n calls to recordObjectAllocation( ) for a given object type (in the above example the type is "MyClass"), where n is a number that can be assigned a default value based on previous experiments, and/or changeable by the developer through the User Interface (UI) of the profiler tool. It should be noted that n may be a fairly large number, e.g., varying between 10 and 100. In one embodiment, if n equals 10, 9 times out of 10 when recordObjectAllocation( ) is called for class Foo, the function will only record the fact that an object of type Foo has been allocated. On the 10th call, however, the function will also sample the stack and record this information (the call path) as well. It will be apparent to one skilled in the art that Foo and the other names utilized in the programming samples provided herein are exemplary and arbitrary so as not to be confused or limited to a particular convention. In addition, any suitable proportion for the number of times the stack is sampled may be applied, as the numbers for n listed above are exemplary and not meant to be limiting.

The embodiments described herein provide a scheme that allows for easily distinguishing between leaking and nonleaking objects in most situations. Additionally, the scheme can identify where leaking objects are allocated, which in turn assists in quickly identifying the root cause of the problem in order to correct the memory leaks. As most memory leaks develop as a gradual increase in the number of unused objects, the scheme described herein is well suited for the identification of these gradual increases. In one embodiment, the scheme requires support from the virtual machine or a run time system, on top of which the program being profiled runs. The system should be able to intercept object reclamation events for individual objects (also referred to as object garbage collection events) and garbage collection finish events (i.e. when a given garbage collection cycle is finished and the user application, that was suspended to make garbage collection possible, is ready to be resumed). Once the event is intercepted, the system should notify a user (or a special profiling/debugging tool) about this event. If a system can intercept object allocation events as well, it may also be useful (this can be used as an alternative to injected calls such as recordObjectAllocation( ) described above). It should be appreciated that support for interception of object reclamation events is available, for example, in modern Java virtual machines where it can be implemented either using weak references (instances of a special library class such as java.lang.ref.WeakReference standard library class). Alternatively, support for object reclamation may be available through special application program interfaces designed to be used by profiling and debugging tools, such as JVMPI and Java Virtual Machine Debug Interface (JVMDI).

As mentioned above, the embodiments described herein take advantage of the fact that a typical memory leak appears as a steadily growing group of objects of some type, that never gets reclaimed. One embodiment of this invention provides a way of distinguishing objects associated with memory leaks from other "healthy" groups of objects of the same type, that are either short-lived, i.e., reclaimed quickly, or long-lived but have been allocated once and do not grow in number any longer. In order to distinguish objects in these groups three kinds of events are tracked: object allocation, object reclamation, and garbage collection, i.e., a garbage collection finish event. The virtual machine or any other suitable run time system is enabled to intercept these events.

In another, low overhead embodiment, described further below, a system administrator is able to detect memory leaks in running applications without impacting application performance. The running application is written in an object-oriented language. For this embodiment to work, it is necessary that the VM or runtime system that executes the application features Mark and Compact, Copying, or other suitable garbage collector/object reclamation mechanism, that preserves the order in which objects have been allocated. Here again, the scheme exploits the fact that a memory leak demonstrates an object allocation/reclamation pattern where some objects remain alive after each garbage collection event. Thus, the age spread for these objects grows steadily, irrespective of the number of object changes. The object age is defined as the number of survived garbage collection events.

FIG. 1 is a simplified schematic diagram illustrating a run time for an application being divided into epochs in accordance with one embodiment of the invention. An epoch is a period of time between two sequential garbage collection finish events. Here, five epochs are displayed. That is, the dividers indicated by lines 100-1 through 100-4 define time periods, i.e., epochs, between the sequential garbage collection finish events. Thus, a first garbage collection event occurred during epoch 1, and ended at the time associated with line 100-1, and so on.

As illustrated further below, the object(s) allocated during a given epoch and surviving a garbage collection that ends this epoch, are referred to as a surviving generation. It should be further appreciated that the terms "garbage collection" and "object reclamation" are interchangeable as used herein. In the Figures described below, FIGS. 1-7 illustrate embodiments which detect a memory leak and provide information on the location/cause of the memory leak. FIGS. 8A-10 provide embodiments that detect the existence of a memory leak without pinpointing the location/cause. Thus, the embodiments associated with FIGS. 1-7 may add runtime overhead, while the embodiments associated with FIGS. 8A-10 do not add noticeable runtime overhead.

FIGS. 2A and 2B represent exemplary data structures, e.g., tables, that may be used to capture object allocation data in accordance with one embodiment of the invention. Tables 102 and 104 are 2xn tables that are initially empty and configured as a growable array. It should be appreciated that either Tables 102 and 104, or both tables 102 and 104, may be hash tables. A line, or row, in Table 104 corresponds to a single surviving object. The line captures the unique object I.D. assigned to the surviving object and the number of the epoch when this object was allocated. A unique ID is assigned to the corresponding object by the profiling code when this object is allocated, and then a new line with this data is added to Table 104. The profiling code discussed above may be used here to assign the unique ID. Accordingly, "object A"-"object I" of Table 104 represent the assigned unique identifiers. When the object is reclaimed (garbage collected), the corresponding line is removed from Table 104.

In FIG. 2A, Table 102 captures the sequential epoch numbers and the number of surviving objects for each sequential epoch number. That is, each row of the table corresponds to a surviving generation of objects. Here, whenever an object is allocated and Table 104 is updated, Table 102 is checked if a line for the corresponding epoch exists. If a line for the corresponding epoch exists, then the number of objects in this line is incremented. If a line for the corresponding epoch does not exist, then a new line is created with the initial value equal to one. Whenever an object is reclaimed and Table 104 is updated accordingly, the counter in the corresponding epoch line of Table 102 is decremented. Thus, if the object associated with epoch 1 of Table 102 is reclaimed, the number of surviving objects associated with epoch 1 would be reduced by 1, resulting in 0. When the counter reaches zero, the table is compacted so that there are no lines in Table 102 with a number of objects equal to zero. It should be appreciated that the number of non-empty lines in Table 102 represents the number of surviving generations. That is, in Table 102 there are five surviving generations as there are five lines or rows. As the number of surviving generations increases, it is more likely that a memory leak is present.

FIGS. 3A and 3B represent the tables of FIGS. 2A and 2B, respectively, after an object reclamation event in accordance with one embodiment of the invention. Here, the objects associated with unique identifiers object C and object F have been reclaimed by the garbage collector. Thus, the third and fifth lines of Table 104 in FIG. 2B have been eliminated due to the reclamation of the corresponding objects. As mentioned above, object reclamation is performed by the garbage collector, when it finds that objects associated with unique identifiers C and F are no longer reachable, i.e., traceable to a root graph. Thus, in Table 108 the line entries for unique identifiers object C and object F have been deleted and Table 108 has been compacted. In turn, Table 106 of FIG. 3A is updated to reflect the reclamation of the objects associated with unique identifiers object C and object F. In particular, the line for epoch 2 and epoch 4 are decremented by one. It should be appreciated that once all objects that have been allocated in a particular epoch of Table 106 are reclaimed, the corresponding line will disappear, i.e., Table 106 will be compacted. That is, if the remaining surviving object for epoch 2 of Table 106 was reclaimed, then that line in Table 106 would disappear and the lines for epochs 3, 4, and 5 would move up in response to the empty line left from the reclamation of the remaining surviving object.

FIGS. 4A and 4B represent exemplary epoch/number of surviving object pairs captured in tables in accordance with one embodiment of the invention. In FIG. 4A, Table 110 illustrates a possible memory leak situation. As shown, the leaking objects prevent table compaction, so that after some number of garbage collections Table 110 results. Even though there are a small number of surviving objects, the long and growing number of surviving generations indicates a high probability of a slow memory leak in this case. On the other hand, Table 112 of FIG. 4B indicates a situation where a memory leak is likely not occurring. Here, there are a high number of surviving objects for two epochs, however, the number of surviving generations is very small—just two. Thus, in Table 110 of FIG. 4A the garbage collector is unable to eliminate a number of generations, thereby indicating a memory leak. In contrast, the objects associated with Table 112 are allocated and discarded quickly.

FIG. 4C illustrates several epoch/surviving generation pair tables, each of which corresponds to a particular line number of an application in accordance with one embodiment of the invention. That is, in this example the profiler associates a separate table with each location in the program where an object may be allocated (an allocation site). It should be appreciated that different granularity may be obtained based upon line numbers, functions, etc. That is, all object allocations that happen within a function, or a larger program module, can be aggregated into one table. In FIG. 4C the number of entries for Table 118 (this table corresponds to the object allocation operation in line 10), as compared to the number of entries for Table 114 through Table 117, indicates leaky behavior for Table 118. It should be appreciated that the value of x in the number of surviving objects columns may be any suitable integer greater than 0. Thus, a user would be alerted that the memory leak is associated with line 10 of the corresponding application. Of course, this implementation will be associated with a higher runtime overhead.

Figure 5:
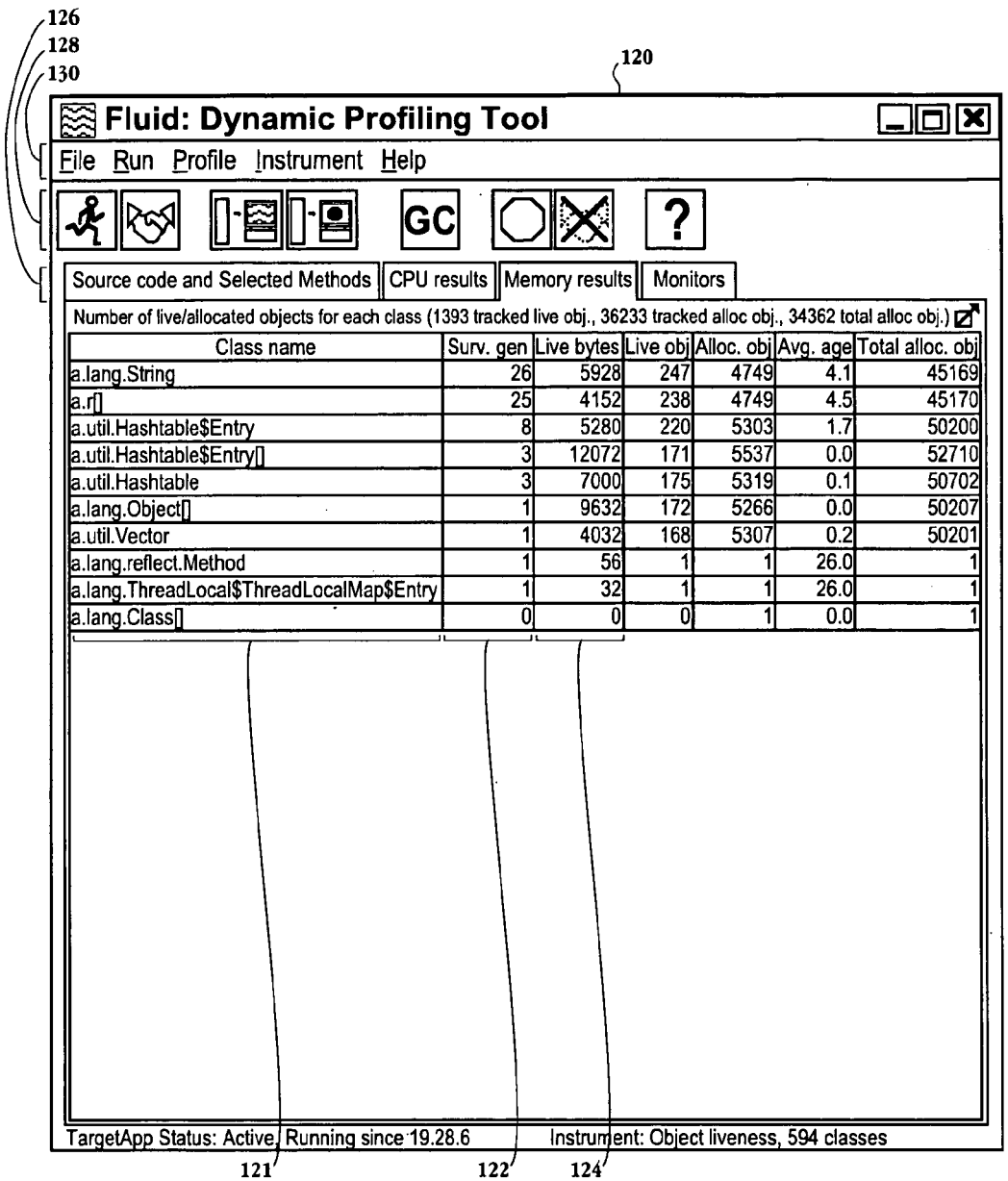
FIG. 5 is an exemplary graphical user interface illustrating the objects in the Java virtual machine memory, grouped by types and sorted by the number of surviving generations in accordance with one embodiment of the invention

FIG. 5 is an exemplary graphical user interface illustrating the objects in the Java virtual machine memory, grouped by types and sorted by the number of surviving generations in accordance with one embodiment of the invention. Here, for the class String of column 121, the number of surviving generations in column 122 is much higher even though the memory occupied by these objects is relatively low, as illustrated in column 124. Because the number of surviving generations is much higher, it is an indication that some objects of class String are leaking. Rows 126, 128, and 130 represent toolbars having navigation tools/buttons that may be useful in conjunction with graphical user interface (GUI) 120 illustrated in FIG. 5.

Figure 6:
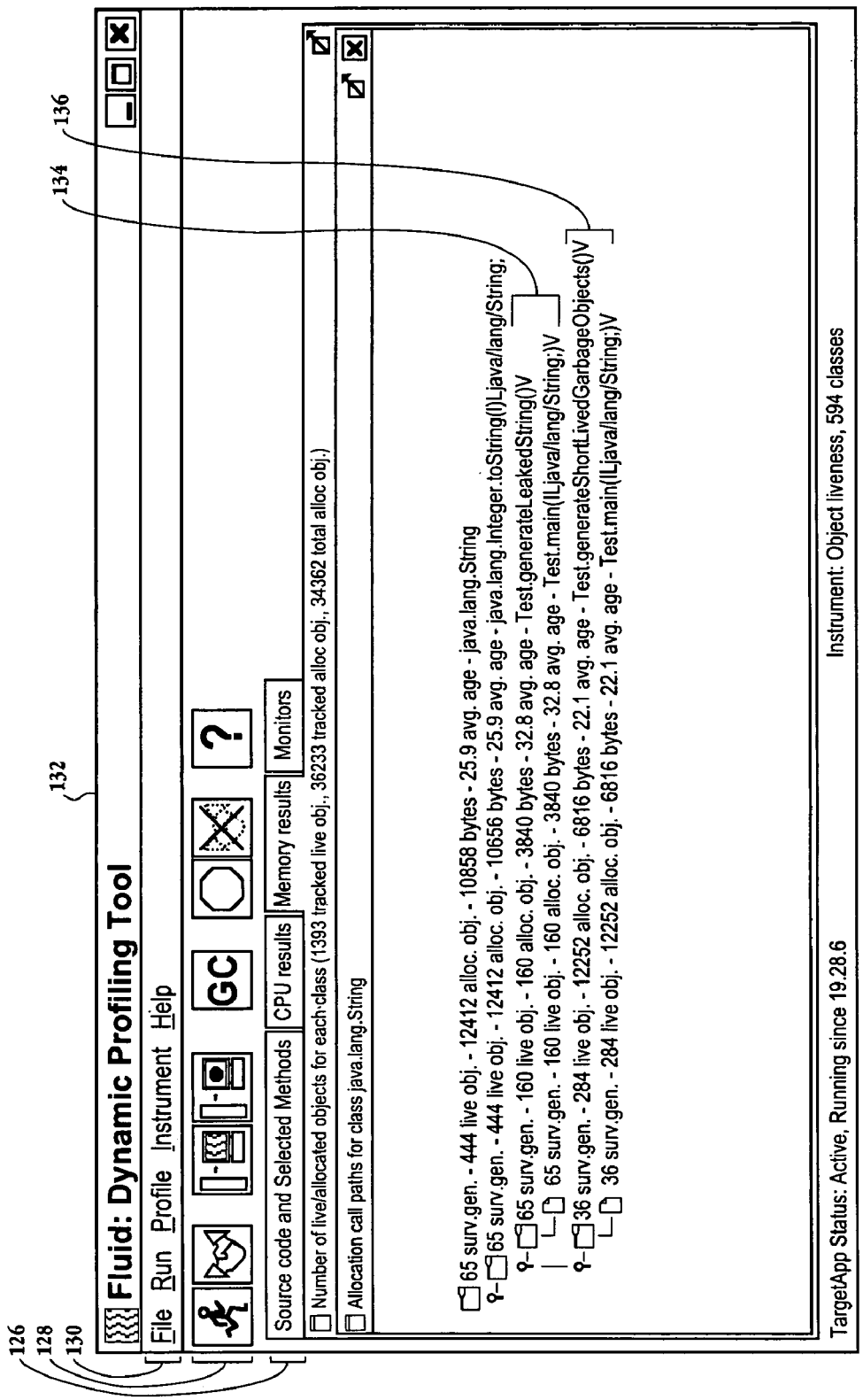
FIG. 6 is another exemplary graphical user interface illustrating the allocation paths for objects of type string of FIG. 5 in accordance with one embodiment of the invention.

FIG. 6 is another exemplary graphical user interface illustrating the allocation paths for objects of type string of FIG. 5 in accordance with one embodiment of the invention. It should be appreciated that these allocation paths may be gathered as described in application Ser. No. 10/783,683, which has been incorporated by reference. As illustrated in GUI 132 the strings allocated by the path illustrated in rows 134 have a higher number of surviving generations than the strings allocated by the path in rows 136. This is despite the fact that at the moment there are more surviving objects allocated by the path 136, than by the path 134. Thus, through GUI 132 a user could pinpoint the place where the leaking strings are allocated. In particular, the pathway illustrated by row 134 would indicate where the leaking strings are allocated.

Figure 7:
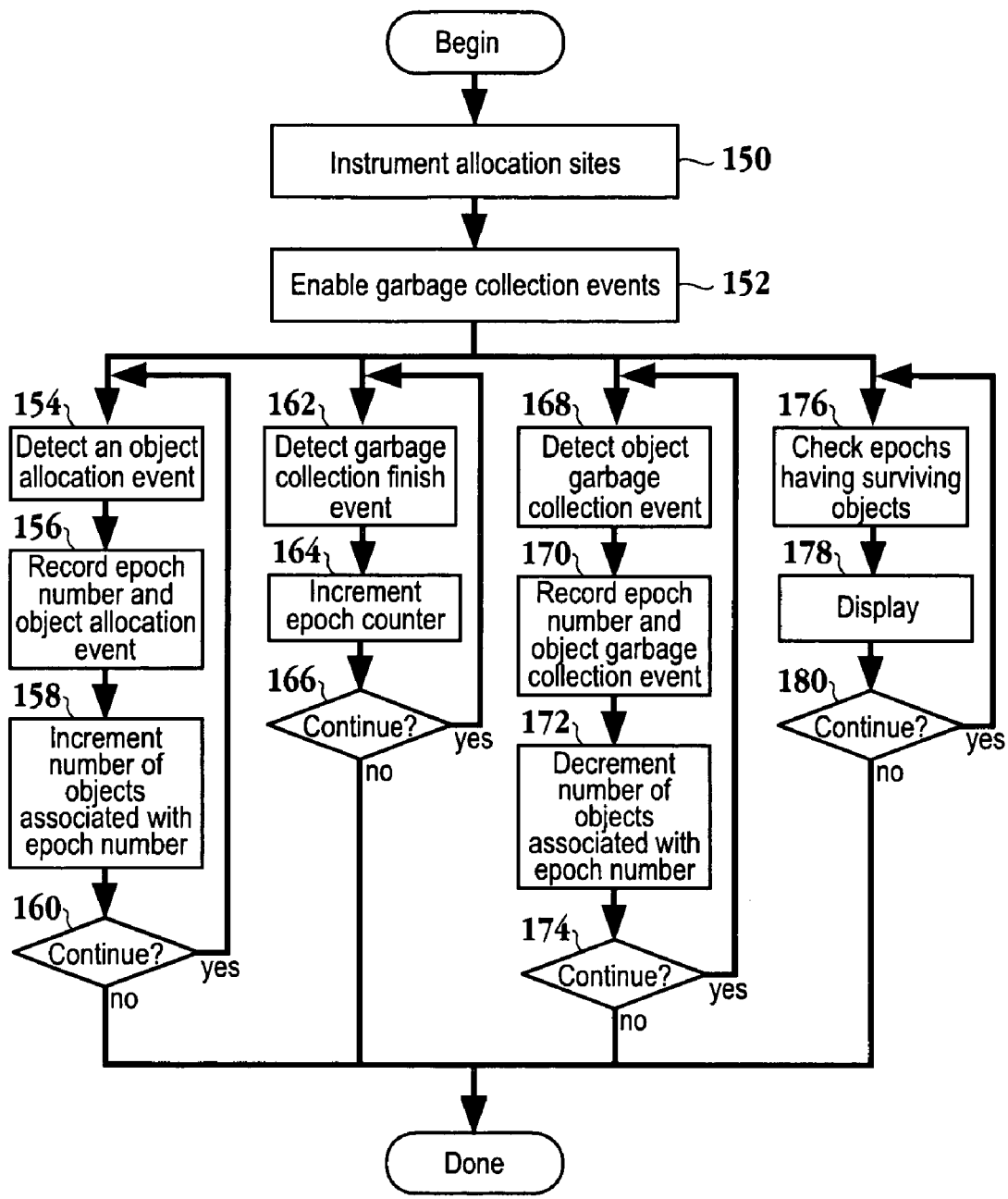
FIG. 7 is a flow chart diagram illustrating the method operations for identifying memory leaks in accordance with one embodiment of the invention.
Figure 8:
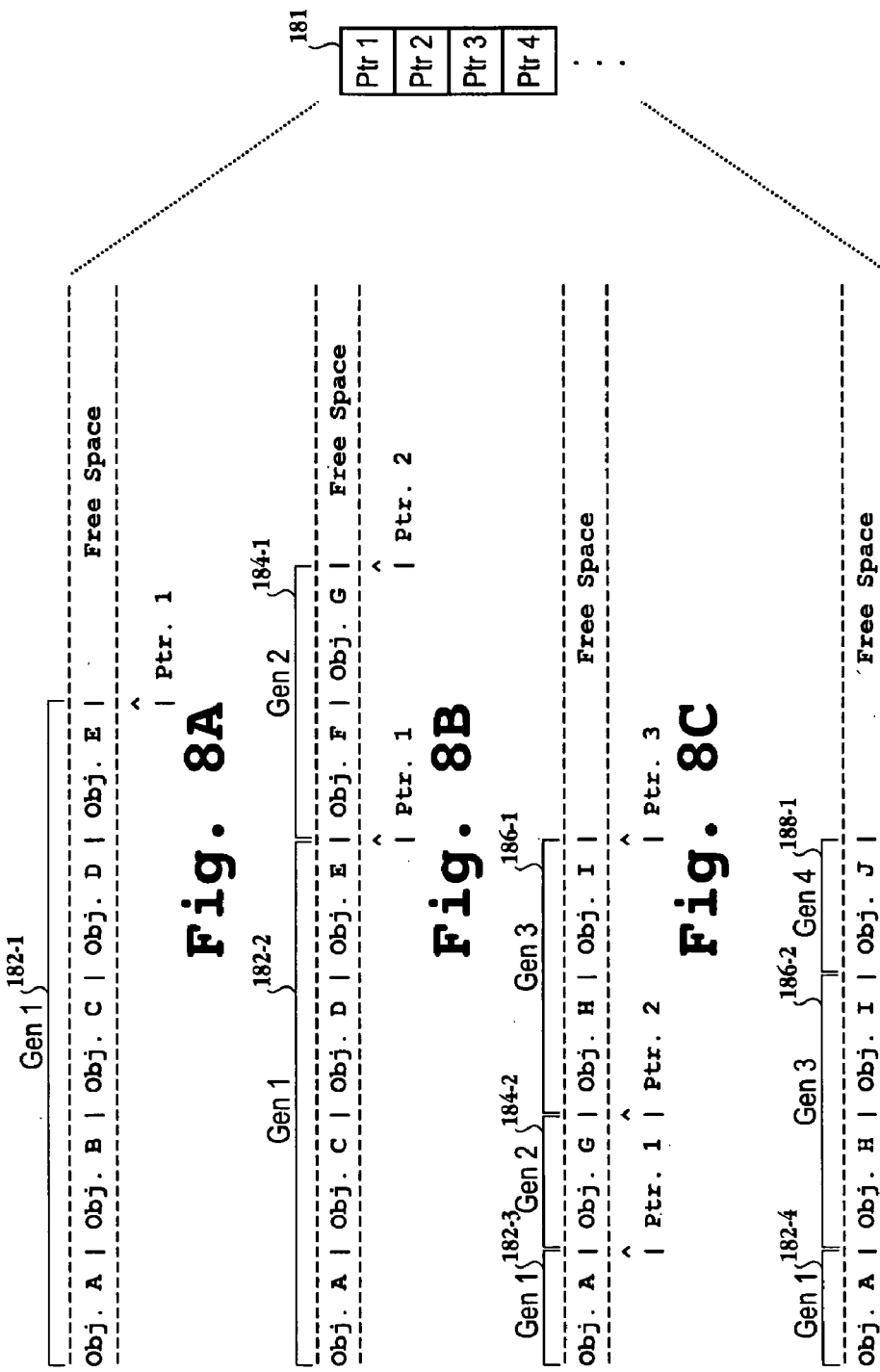
FIGS. 8A through 8D illustrate a low overhead scheme for identifying memory leaks in accordance with one embodiment of the invention.

FIG. 7 is a flow chart diagram illustrating the method operations for identifying memory leaks in accordance with one embodiment of the invention. The method initiates with operation 150 where allocation sites are instrumented. Here, code may be injected into the application in order to allow for the monitoring described herein. In particular, the code may be inserted in order to allow interception of object allocation, object reclamation and garbage collection, i.e., a garbage collection finish event. Here again, the embodiments discussed with reference to application Ser. No. 10/783,683, may be used here to inject code to track object allocations in order to collect, process, and present profile data. The method then advances to operation 152 where garbage collection events are enabled. It should be appreciated that the work of this method depends on the periodical "garbage collection finish" events generated by the virtual machine (or, generally, a runtime system), since for any object being kept track of, the number of "garbage collection finish" events happening after the corresponding object's creation determines the objects age.

The method of FIG. 7 then breaks off into four branches where the four branches may be executed in parallel, e.g., four concurrent threads may be executing each branch. It should be apparent to one skilled in the art, that the code representing one or more of the branches (for example, the one that registers object allocation events) may be executed on behalf of the threads of the user application, or the code may be executed by a thread specially set up by the profiling tool for the corresponding task. In the first branch, operation 154 detects an object allocation event. It should be appreciated that object allocation events may be detected as discussed in application Ser. No. 10/783,683. Then in operation 156 the epoch number and object allocation event are recorded. Thus, Tables 102 and 104 are being built as described above in this branch. In operation 158, the number of objects associated with the epoch number is incremented as described with reference to the Tables of FIGS. 2A through 3B. In decision operation 160 it is determined whether or not to continue. One skilled in the art will appreciate that the explicit check for continuation may or may not be present in the real implementation; such a check can be effectively replaced with, for example, an operation to terminate the corresponding thread of execution by force. If it is desired to continue the method returns to operation 154 and repeats as described above. If it is determined not to continue, the branch terminates.

In the second branch, in operation 162 a garbage collection finish event is detected. After detecting the garbage collection finish event, the epoch counter is incremented in operation 164. For example, another epoch line may be added to the epoch/number of surviving objects table discussed above, or an appropriate global counter may be incremented. Then in operation 166 it is determined whether or not to continue. If it is desired to continue the method returns to operation 162 and repeats as described above. If it is not desired to continue the branch terminates. In the third branch an object garbage collection event is detected. In one embodiment, reclamation of an object occurs here. The method then advances to operation 170 where the epoch number and object garbage collection event are recorded. Then, in operation 172 the number of objects associated with the epoch number is decremented due to the reclamation of the object. Thus, the Tables described above in FIGS. 2A-3B may be compacted here. In decision operation 174 if it is desired to continue, the method returns to operation 168 and repeats as above, while if it is not desired to continue the branch terminates.

In the fourth branch, in operation 176 the number of epochs having surviving objects is checked. This number may then be displayed in a graphical user interface in order to alert the user as to a possible memory leak. Exemplary embodiments of the graphical user interface include FIGS. 5 and 6. The method then advances to operation 180 where it is determined whether or not to continue. If it is determined to continue, the method returns to operation 176, while if it is not determined to continue, the branch terminates. One skilled in the art will appreciate that a certain number of time periods, i.e., epochs, may have to occur prior to concluding that a memory leak is occurring. That is, the data structures referred to above are built to a certain point in order to have a suitable confidence level to conclude that a memory leak is present.

In order to keep track of object allocations and reclamations in the Java programming language/platform, it is possible to use the following mechanism in one embodiment of the invention. All object allocation sites are instrumented, such that immediately after an object is allocated, a method referred to as trackObjectAllocation (Ojbect obj), is called. This method reads the current epoch number, the stack trace for the call, and eventually associates an object with all this information. In one embodiment, for the profiling system JFluid (of the assignee), this is done by creating a unique object ID as a combination of the object's class id, epoch number, and the serial number of the object itself. This ID, along with the stack trace, is sent to the JFluid client tool, that maintains the call stacks, "epoch/number of surviving objects" tables, and presents the final results to the user.

The trackObjectAllocation( ) method also creates a weak reference (an instance of the java.lang.WeakReference class) for obj, and puts a "WeakReference (obj)-ObjectID (obj)" pair into the special hash table that it maintains. Additionally, the above weak reference is associated with a single reference queue (an instance of java.lang.ref.ReferenceQueue class), which is also maintained. This mechanism allows for a notification when obj gets reclaimed. To get a notification, a separate thread is run in parallel with the main program, that keeps querying the reference queue for discarded objects using the ReferenceQueue.remove( ) method. Once this method returns with a WeakReference instance, the corresponding object obj is about to be garbage collected. The hash table is accessed to get the unique object ID for obj, and remove WeakReference (obj) from the table. Finally, the objectID (obj) is sent to the JFluid client tool, that updates the corresponding "epoch/number of objects" table accordingly.

Ultimately, the JFluid tool allows the user to request information about the number of live objects for each type, their average age (expressed in survived epochs), and the maximum number of surviving generations. Information can be sorted by each of these numbers. If the user suspects that the program has a memory leak, the user can choose sorting types by the maximum number of surviving generations, and then check periodically if this value is relatively large and keeps growing for some type. If that is the case, the user can further determine which combination of allocation site/call stack results in objects with the largest number of surviving generations. It should be appreciated that knowing the leaking class and this location may be a significant help in identifying the root cause of the memory leak.

FIGS. 8A through 8D illustrate a low overhead scheme for identifying memory leaks in accordance with one embodiment of the invention. As mentioned above, a typical memory leak looks like a steadily growing group of objects of some type, which never get reclaimed. The main property that distinguishes such objects from other "healthy" groups of objects of the same type is that the age spread for leaking objects grows over time. Here, "object age" refers to the number of garbage collection cycles that the object has survived. In a memory leak situation, the number of objects of any particular age may be relatively small, but the total number of different ages for leaking objects keeps growing. Using this observation, it is possible to track all, or some proportion of, objects that a program allocates and garbage collects, and ultimately distinguish between leaky and healthy objects. The low overhead scheme described with respect to FIGS. 8A through 10 will be able to identify an application that is likely to have a memory leak, however, will not pinpoint the location for the user as described above with reference to FIGS. 1 through 7. Thus, once a memory leak is identified, the embodiments described above with reference to FIGS. 1 through 7 may be applied in order to determine or pinpoint the cause of the memory leak. Accordingly, the low overhead scheme may be used in a production environment to indicate if a memory leak exists, and then the embodiments of FIGS. 1-7 can be attached to the VM to be used as a tool to pinpoint the cause of the memory leak.

FIGS. 8A through 8D represent a scheme where every time a garbage collection and heap compaction for a heap region is complete, the virtual machine marks the boundary between the occupied and the free heap spaces, using a pointer or some other suitable marker that is kept in a dedicated side data structure. One skilled in the art will appreciate that a heap is a pre-reserved area of memory that a program may use to store data in some variable amount of memory that is not known until the program is running. Thus, in FIG. 8A, a garbage collection operation is performed after object E has been allocated, thereby inserting a pointer pointing to the location right after object E. The objects allocated up to the first garbage collection are represented as generation 1 in region 182-1. It should be appreciated that array 181 may be used to store the values of the pointers, i.e. memory addresses at which they point. As discussed in more detail below, array 181 is incorporated into a memory region associated with the system running the object-oriented application. In FIG. 8B a second garbage collection has occurred after the allocation of object G. The allocation of objects F and G represent generation 2 184-1. Object B has been reclaimed during the garbage collection cycle following generation 2 184-1. Thus, generation 1 182-2 has been compacted due to this reclamation. As discussed with reference to FIG. 8A, pointer 2 is configured to point to a location corresponding to the end of generation 2 184-1, which currently corresponds to the end of object G. Additionally, pointer 1 is updated to point to the end of compacted generation 1, 182-2.

Then, in FIG. 8C a third garbage collection has occurred in which objects C, D, E and F have all been reclaimed. Thus, generation 1 182-3 now includes object A, generation 2 184-2 includes object G, and generation 3 186-1 includes objects H and I. The objects of each surviving generation have been compacted. That is, each object has been moved so that there are no holes in the heap. Accordingly, the pointers, which represent the boundaries between surviving generations, have been likewise updated in order to preserve the order. Then, in FIG. 8D a fourth garbage collection event occurs in which object G has been reclaimed and object J remains in generation 4 188-1. Generation 3 186-2 includes objects H and I, while generation 1 182-4 includes object A. With object G reclaimed, generation 2 disappears and pointer 2 and pointer 1 then correspond to the same location. When this happens, the pointers are collapsed into one pointer as no objects separate them.

It should be appreciated that rather than using pointers, markers may be used, where a marker is just an ordinary object of a small fixed size. That is, a marker may be inserted at the end of each generation, by simply allocating an object on the heap using the standard object allocation procedure. Where two markers are adjacent to each other, the two adjacent markers will collapse into one marker (by simply deleting one of the corresponding objects), similar to the collapse of two pointers corresponding to the same location as illustrated in FIG. 8D.

Figure 9:
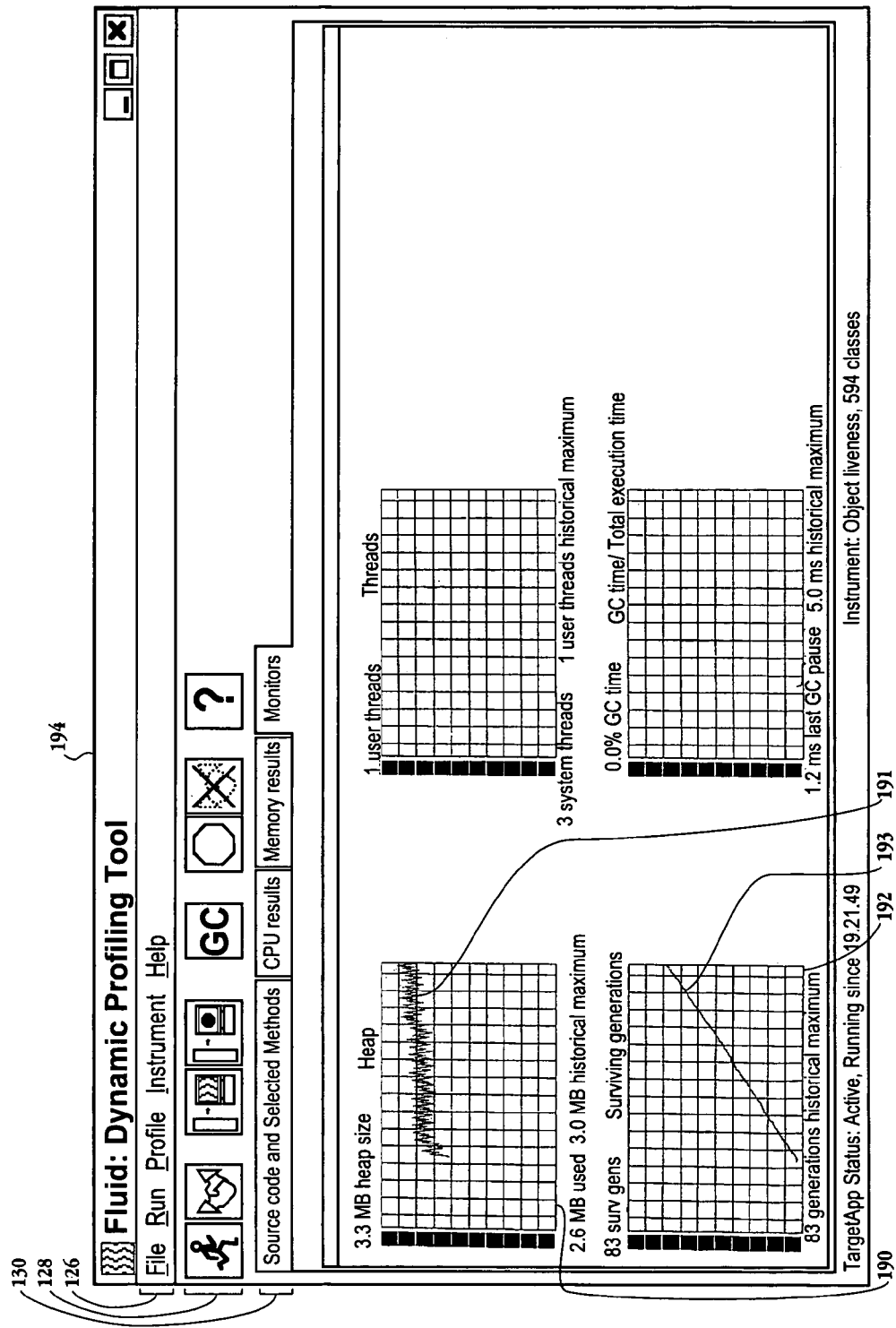
FIG. 9 is an exemplary graphical user interface which may be presented to a user to indicate a memory leak in accordance with the low overhead embodiment described with reference to FIGS. 8A through 8D.

FIG. 9 is an exemplary graphical user interface which may be presented to a user to indicate a memory leak in accordance with the low overhead embodiment described with reference to FIGS. 8A through 8D. Graph 190 illustrates the memory usage over time. As shown, there is a slight trend upwards as indicated by line 191. In graph 192 the surviving heap generations are illustrated over time. Line 193 increases relatively fast, as compared to line 191, and line 193 never decreases, thus indicating a memory leak. This situation will be identified by the embodiments described herein.

Figure 10:
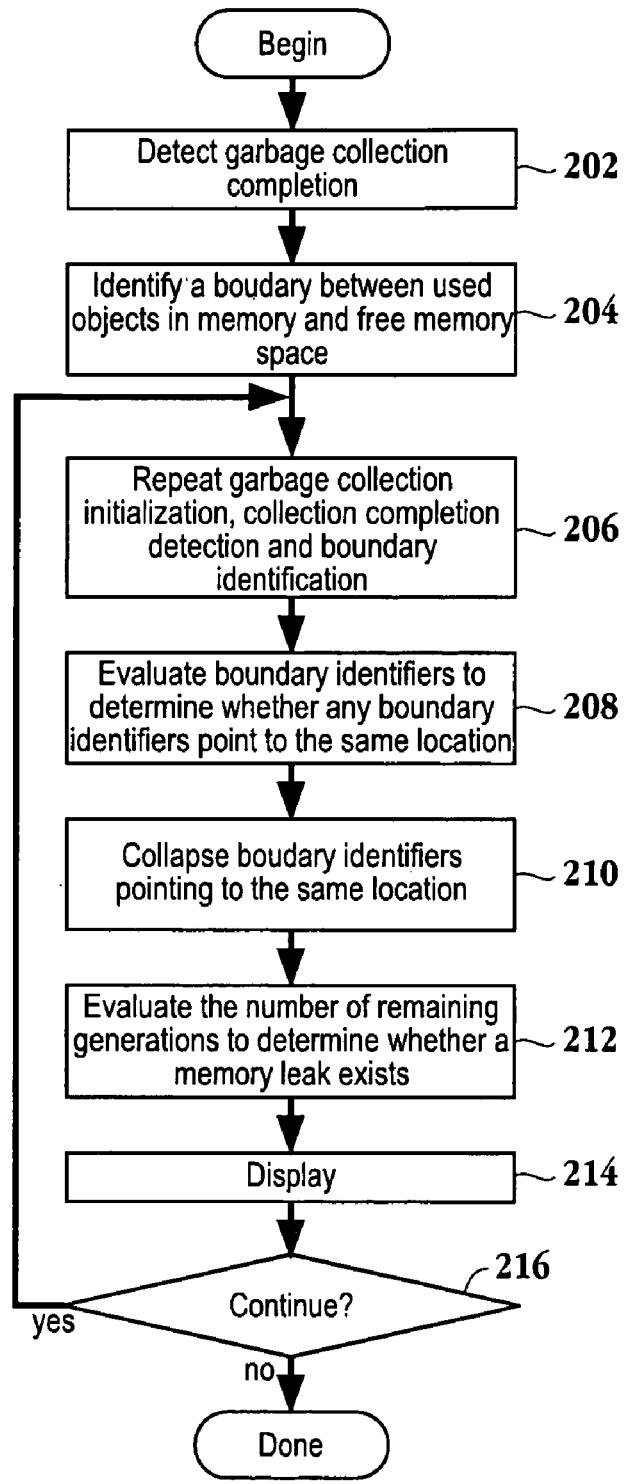
FIG. 10 is a flow chart diagram illustrating the method operations for a low overhead method for identifying memory leaks in accordance with one embodiment of the invention.

FIG. 10 is a flow chart diagram illustrating the method operations for a low overhead method for identifying memory leaks in accordance with one embodiment of the invention. The method initiates with operation 202 where the garbage collection completion is detected. As discussed above, modern Java VMs, in particular, provide standard means of notifying the user code about garbage collection completion. Additionally, alternative systems featuring a garbage collector can be modified to emit such events. The method then proceeds to operation 204 where a boundary between used objects in the heap and the free heap space is identified. The division illustrated with reference to FIG. 8A occurs here. The method then moves to operation 206 where the garbage collection initialization, garbage collection completion detection, and boundary identification of operations 200, 202 and 204 are repeated as necessary as illustrated with reference to FIGS. 8B-8D. Then, the boundary identifiers are evaluated to determine whether any boundary identifiers point to the same location in operation 208. In operation 210, boundary identifiers pointing to the same location are collapsed so that a single boundary identifier remains. Here, with reference to FIG. 8D, the collapse of pointers 1 and 2 into pointer 1, or alternatively, two adjacent markers collapsed into one marker, illustrates the functionality represented by operation 210.

The method then advances to operation 212 where the number of remaining generations is evaluated to determine whether a memory leak exists. As discussed above, in case of a memory leak some objects in each or almost each generation will survive after every garbage collection round, and thus the number of surviving generations or the number of different object ages increases. The method then proceeds to operation 214 where a graphical user interface may display this data as described with reference to FIG. 9. In decision operation 216 it is determined whether to continue. If it is desired to continue, the method returns to operation 206 and repeats as described above, while if it is not desired to continue, the method terminates.

Figure 11:
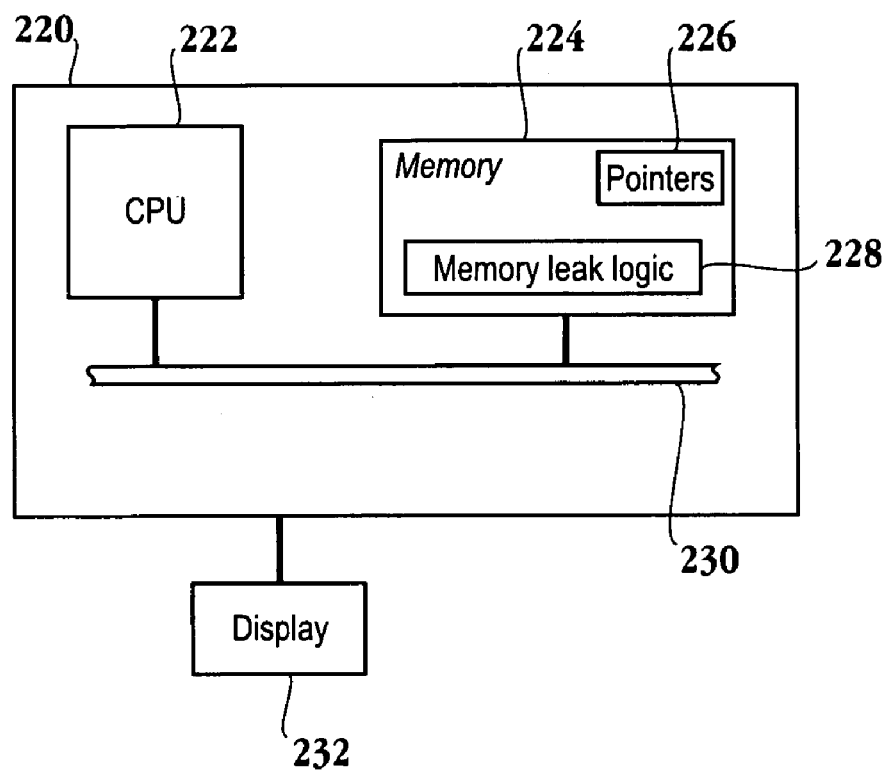
FIG. 11 is a simplified schematic diagram of a computing device having the ability to identify a memory leak in accordance with one embodiment of the invention.

FIG. 11 is a simplified schematic diagram of a computing device having the ability to identify a memory leak in accordance with one embodiment of the invention. Computing device 220 includes central processing unit 222, memory region 224, and bus 230 interconnecting the CPU and memory region. Memory region 224 includes pointer array 226 and memory leak logic 228. It should be appreciated that memory leak logic 228 is configured to track object allocation as described in reference to FIGS. 1 through 10 herein. That is, the functionality described above for identifying a memory leak is incorporated into the memory leak logic. Thus, memory leak logic includes logic for detecting completion of the garbage collection event, logic for labeling each surviving generation for successive garbage collection events, and logic for determining the existence of memory leaks based upon an increase in surviving generations after successive garbage collection events.

In one embodiment, the logic mentioned above is computer code stored in memory that accomplishes the functionality described with reference to the flowcharts of FIGS. 7 and 10. Display 232 of FIG. 11 is included with the computing device and is used to display the GUIs described above. Of course, display 232 may be integrated into computing device 220.

In summary, the present invention provides a scheme for notifying the user about a memory leak in an object-oriented program at run time. Alternative embodiments are provided. Specifically, a low overhead tool is included, as well as a tool providing more detail on the cause of the memory leak. However, the tool providing more detail comes along with higher runtime overhead. Thus, a system administrator is enabled to detect memory leaks in running applications and correct the situation rather than reacting to a system that crashed from a memory leak. The embodiments described above use the characteristics of a memory leak to detect the memory leak. That is, the embodiments keeps track of allocated/reclaimed objects in order to define a surviving generations metric that indicates the presence of a memory leak.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data that can be thereafter read by a computer system. A communications medium includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The communications medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A low overhead computer implemented method for identifying memory leaks, comprising the operations of:
   a) detecting completion of a garbage collection cycle;
   b) identifying a boundary between used objects in memory and free memory space by inserting
   a marker object on a top of a heap at the completion of the garbage collection cycle, the marker object being a fixed size object;
   c) inserting a reference to the marker object in an array, the array being maintained only to track a plurality of marker objects on the heap;
   d) monitoring memory locations of the plurality of marker objects on the heap, wherein the plurality of marker objects being in the heap through repetition of the inserting the marker object on the top of the heap;
   e) collapsing any adjacent marker objects in the plurality of marker objects in the heap into a single marker object;
   f) deleting the reference to a marker object that is removed through the collapsing, from the array;
   g) repeating a) to f); and
   h) determining existence of memory leaks based upon a size of the array.

2. The method of claim 1, wherein the method operation of identifying the boundary between used objects in memory and free memory space includes, detecting a garbage completion event.

3. The method of claim 2, wherein the collapsing further comprising:
   deleting a marker object from two adjacent marker objects in the plurality of marker objects on the heap, wherein the two marker objects are physically adjacent to each other through memory compaction of the heap.

4. The method of claim 1, wherein the marker object is an instance of a class, the class including only primitive type variables as properties to enable fix size instances of the class.

5. The method of claim 1, wherein the determining further comprising:
   polling the array at regular time intervals to collect a number of object references in the array; and
   displaying a historical data including the number of object references in the array at various times using a graphical user interface.

6. The method of claim 1, wherein the method operation of determining existence of memory leaks includes,
   tracking a total number of object references in the array;
   determining if the total number of object references in the array is increasing over time; and
   indicating a memory leak exists if the total number of object references in the array is increasing over time.

7. A computer readable medium storing program instructions for providing a low overhead method for identifying memory leaks, comprising:
   a) program instructions for detecting completion of a garbage collection cycle;
   b) program instructions for identifying a boundary between used objects in memory and free memory space by inserting a marker object on a top of a heap at the completion of the garbage collection cycle, the marker object being a fixed size object;
   c) program instructions for inserting a reference to the marker object in an array, the array being maintained only to track a plurality of marker objects on the heap;
   d) program instructions for monitoring memory locations of the plurality of marker objects on the heap, wherein the plurality of marker objects being in the heap through repetition of the inserting the marker object on the top of the heap;
   e) program instructions for collapsing any adjacent marker objects in the plurality of marker objects into a single marker object;
   f) program instructions for deleting the reference to a marker object that is removed through the collapsing, from the array;
   g) program instructions for repeating a) to f) after each garbage collection cycle; and
   h) program instructions for determining existence of memory leaks based upon a size of the array.

8. The computer readable medium of claim 7, wherein the program instructions for identifying the boundary between used objects in memory and free memory space includes,
   program instructions for detecting a garbage completion event.

9. The computer readable medium of claim 8, the program instructions for collapsing further comprising:
   program instructions for deleting a marker object from two adjacent marker objects in the plurality of marker objects on the heap, wherein the two marker objects are physically adjacent to each other through memory compaction of the heap.

10. The computer readable medium of claim 7, wherein the marker object is an instance of a class, the class including only primitive type variables as properties to enable fix size instances of the class.

11. The computer readable medium of claim 7, wherein the program instructions for determining further comprising:
    program instructions for polling the array at regular time intervals to collect a number of object references in the array; and
    program instructions for displaying a historical data including the number of object references in the array at various times using a graphical user interface.

12. The computer readable medium of claim 7, wherein the program instructions for determining existence of memory leaks includes,
    program instructions for tracking a total number of object references in the array;

program instructions for determining if the total number of object references in the array is increasing over time; and program instructions for indicating a memory leak exists if the total number of object references in the array is increasing over time.

13. A system for identifying memory leaks for an object-oriented application, comprising:

a microprocessor configured to execute the object-oriented application;

a memory in communication with the microprocessor;

memory leak logic configured to identify a memory leak, the memory leak logic including, logic for detecting completion of the garbage collection event;

logic for identifying a boundary between used objects in memory and free memory space by inserting a marker object on a top of a heap at the completion of the garbage collection cycle, the marker object being a fixed size object;

logic for inserting a reference to the marker object in an array, the array being maintained only to track a plurality of marker objects on the heap;

logic for monitoring memory locations of the plurality of marker objects on the heap, wherein the plurality of marker objects being in the heap through repetition of the inserting the marker object on the top of the heap;

logic for collapsing any adjacent marker objects in the plurality of marker objects into a single marker object;

logic for deleting the reference to a marker object that is removed through the collapsing, from the array; and logic for determining existence of memory leaks based upon a size of the array.

14. The system of claim 13, wherein each of the logic elements are one of or a combination of hardware and software.

15. The system of claim 13, wherein the memory leak logic is stored in the memory.

16. The system of claim 13, wherein the memory leak logic includes, logic for compacting the heap associated with the unused objects after removal of the unused objects.

17. The system of claim 13, wherein the logic for determining existence of memory leaks includes, logic for tracking a number of object references in the array.

18. The system of claim 13, wherein the marker object is an instance of a class, the class including only primitive type variables as properties to enable fix size instances of the class.

19. The system of claim 13, wherein the logic for determining includes, logic for polling the array at regular time intervals to collect a number of object references in the array; and logic for displaying a historical data including the number of object references in the array at various times using a graphical user interface.

* * * * *